United States Patent
Kobayashi et al.

(10) Patent No.: US 12,447,920 B2
(45) Date of Patent: Oct. 21, 2025

(54) VEHICULAR SIDE AIRBAG DEVICE

(71) Applicant: Autoliv Development AB, Vargarda (SE)

(72) Inventors: Yuto Kobayashi, Kanagawa (JP); Tsutomu Sakurai, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 0 days.

(21) Appl. No.: 18/833,723

(22) PCT Filed: Dec. 5, 2022

(86) PCT No.: PCT/JP2022/044727
§ 371 (c)(1),
(2) Date: Jul. 26, 2024

(87) PCT Pub. No.: WO2023/145258
PCT Pub. Date: Aug. 3, 2023

(65) Prior Publication Data
US 2025/0100496 A1  Mar. 27, 2025

(30) Foreign Application Priority Data
Jan. 31, 2022 (JP) .................. 2022-012826

(51) Int. Cl.
*B60R 21/207* (2006.01)
*B60R 21/233* (2006.01)
(Continued)

(52) U.S. Cl.
CPC .......... *B60R 21/207* (2013.01); *B60R 21/233* (2013.01); *B60R 21/2338* (2013.01);
(Continued)

(58) Field of Classification Search
CPC . B60R 21/207; B60R 21/233; B60R 21/2338; B60R 21/237; B60R 21/264; B60R 2021/23386
See application file for complete search history.

(56) References Cited

U.S. PATENT DOCUMENTS 10,960,841 B2  3/2021  Deng et al.
2019/0283700 A1* 9/2019 Kwon .................. B60R 21/2338
(Continued)

FOREIGN PATENT DOCUMENTS

JP  2019-34710 A  3/2019
JP  2021-66426 A  4/2021

*Primary Examiner* — Jason D Shanske
*Assistant Examiner* — Matthew James O'Neill
(74) *Attorney, Agent, or Firm* — Harness, Dickey & Pierce, P.L.C.; Ryan W. Massey

(57) ABSTRACT

An airbag module includes an airbag cushion in a bag shape and in a prescribed rolled or folded storage configuration and an inflator that supplies gas to the airbag cushion. The airbag cushion includes: a main chamber that expands and deploys from a side frame to a side of an occupant seated in a vehicle seat, a sub chamber that expands and deploys protruding from the main chamber to the side of the occupant, an upper tether that stretches from a portion of the main chamber above the sub chamber to the sub chamber, and a lower tether that stretches from a portion of the main chamber below the sub chamber to the sub chamber.

19 Claims, 6 Drawing Sheets

(51) Int. Cl.
  *B60R 21/2338*  (2011.01)
  *B60R 21/237*  (2006.01)
  *B60R 21/264*  (2006.01)

(52) U.S. Cl.
  CPC .......... *B60R 21/237* (2013.01); *B60R 21/264* (2013.01); *B60R 2021/23386* (2013.01)

(56) References Cited

U.S. PATENT DOCUMENTS

| | | | |
|---|---|---|---|
| 2020/0324728 A1* | 10/2020 | Deng | ................ B60R 22/12 |
| 2020/0384941 A1 | 12/2020 | Kwon | |
| 2021/0179009 A1* | 6/2021 | Lee | ................ B60R 21/233 |
| 2021/0402949 A1 | 12/2021 | Sung et al. | |

\* cited by examiner (a)

(b)

(a)

(b)

(c)

VEHICULAR SIDE AIRBAG DEVICE

TECHNICAL FIELD

The present invention relates to a vehicular side airbag device for restraining an occupant seated in a vehicle seat.

BACKGROUND ART

Airbag devices have generally become standard equipment in vehicles in recent years. An airbag device is a safety device which is operated in the event of an emergency such as a vehicle collision, retaining and protecting occupants utilizing an airbag cushion which expands and deploys based on gas pressure. There are various types of airbag devices depending on the installation site and application. For example, an airbag 16 described in FIG. 2A of Patent Document 1 is provided on the interior side on a seatback 14 in the vehicle width direction and provides restraint near a shoulder of the occupant.

In the technology in Patent Document 1, an upper panel 18 and lower panel 20 are provided on the upper part and lower part of the airbag 16. This upper panel 18 and lower panel 20 are connected to a retractor 52 via a strap 54 and functioning of the retractor 52 enables pulling the airbag 16 to the seatback side. Thereby, as depicted in FIG. 3B, a valley 24 is formed in the airbag 16 between a first portion 64 and a second portion 66 and this valley 24 is able to restrain the shoulder of the occupant.

RELATED ART DOCUMENTS

Patent Documents

[Patent Document 1] U.S. Pat. No. 10,960,841 Specification

SUMMARY OF THE INVENTION

Problem to be Solved by the Invention

With airbag devices, reducing the amount of movement of the occupant is an important evaluation item for lowering injury values of an occupant. In addition to conventional methods of increasing dimensions of the airbag cushion and raising pressure, restricting movement of the airbag 16 using the upper panel 18 and a retractor 52 as in Patent Document 1 can also be used to achieve a reduction in the amount of movement of the occupant. However, the technology using the upper panel 18 or retractor 52 of Patent Document 1 has many elements added to the device configuration, and so may not be adopted due to installation location and cost constraints. Similarly, increasing dimensions or raising pressure of the airbag cushion cannot be easily adopted.

In light of the foregoing, an object of the present invention is to provide a vehicular side airbag device that enables improving occupant restraint performance of the airbag cushion using a simple configuration.

Means for Solving the Problem

A typical configuration of a vehicular side airbag device according to the present invention for resolving the problem described above is a vehicular side airbag device mounted on a side frame of a seatback of a seat for a vehicle, comprising:
an airbag cushion that is bag shaped and in a prescribed rolled or folded configuration; and
an inflator that supplies gas to the airbag cushion; wherein the airbag cushion includes:
a main chamber that expands and deploys from the side frame to a side of an occupant seated on the vehicle seat,
a sub chamber that expands and deploys protruding from the main chamber to the side of the occupant,
an upper tether that stretches from a portion of the main chamber above the sub chamber to the sub chamber, and
a lower tether that stretches from a portion of the main chamber below the sub chamber to the sub chamber.

In general, rotational behavior of the head is known to readily raise injury value and the configuration described above can suppress rotational behavior of the head using the sub chamber. In particular, in addition to the sub chamber being broadly supported by the main chamber, pulling by the upper tether and lower tether enables retaining orientation thereof. Thus, with the configuration described above, during occupant restraint, the sub chamber can efficiently absorb energy from the head of the occupant, achieve a simple configuration, and suitably lower injury value of the occupant.

One of the upper tether and lower tether described above may be longer than the other. This configuration enables controlling contact position and contact timing of the sub chamber with the head by tilting the sub chamber upwards or downwards.

The upper tether described above may be longer than the lower tether. This configuration enables, for example, tilting the sub chamber downward.

The lower tether described above may be longer than the upper tether. This configuration enables, for example, tilting the sub chamber upward.

In detail, the length of the upper tether described above may be shorter than the distance from the connecting part of the upper tether on the main chamber to the connecting part of the upper tether on the sub chamber when the main chamber and sub chamber expand and deploy with the upper tether and lower tether omitted.

The configuration described above enables efficiently tensing the upper tether during expansion and deployment of the airbag cushion. Thus, for example, the shape of the airbag cushion can be arbitrarily controlled, such as tilting the sub chamber upward.

In detail, the length of the lower tether described above may be shorter than the distance from the connecting part of the lower tether on the main chamber to the connecting part of the lower tether on the sub chamber when the main chamber and sub chamber expand and deploy with the lower tether and upper tether omitted.

The configuration described above enables efficiently tensing the lower tether during expansion and deployment of the airbag cushion. Thus, for example, the shape of the airbag cushion can be arbitrarily controlled, such as tilting the sub chamber downward. Furthermore, both the upper tether and the lower tether can be tensed, causing the main chamber to curve towards the sub chamber.

Effect of the Invention

The present invention can provide a vehicular side airbag device that can improve occupant restraint performance of the airbag cushion with a simple configuration.

DESCRIPTION OF THE PREFERRED EMBODIMENTS

Preferred embodiments according to the present invention will hereinafter be described in detail with reference to the attached drawings. Dimensions, materials, other specific numerical values, and the like indicated in the embodiments are merely examples for ease of understanding of the invention and do not limit the present invention unless otherwise noted. Note that in the present specification and drawings, elements having essentially identical functions and configurations are labeled with identical symbols in order to omit redundant descriptions along with an illustration of elements not directly related to the present invention.

Figure 1:
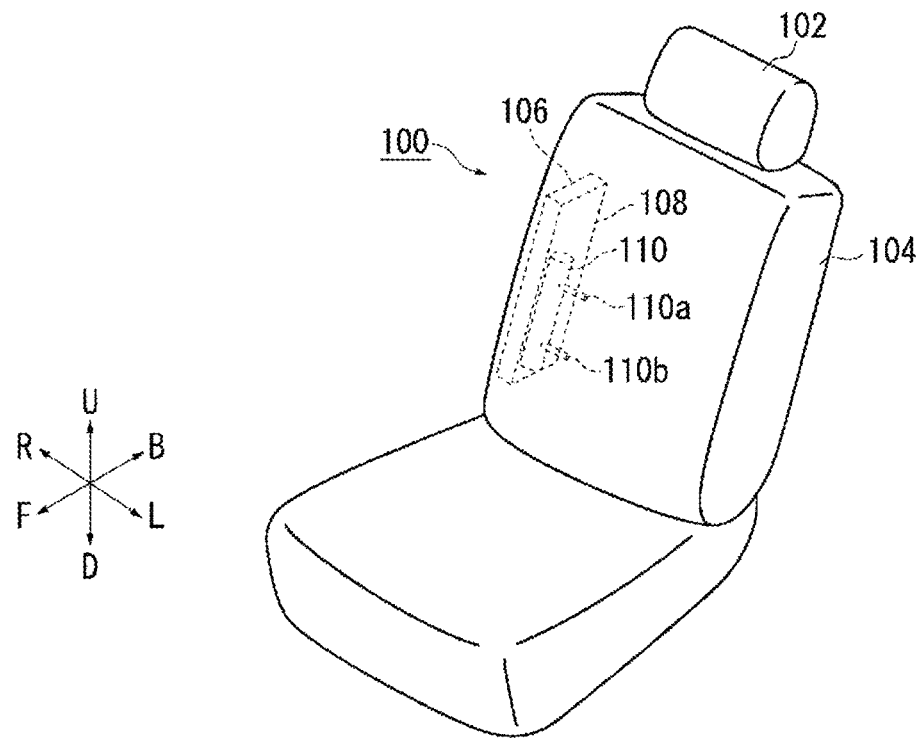
FIG. 1 is a diagram depicting a vehicular side airbag device according to an embodiment of the present invention.
Figure 1:
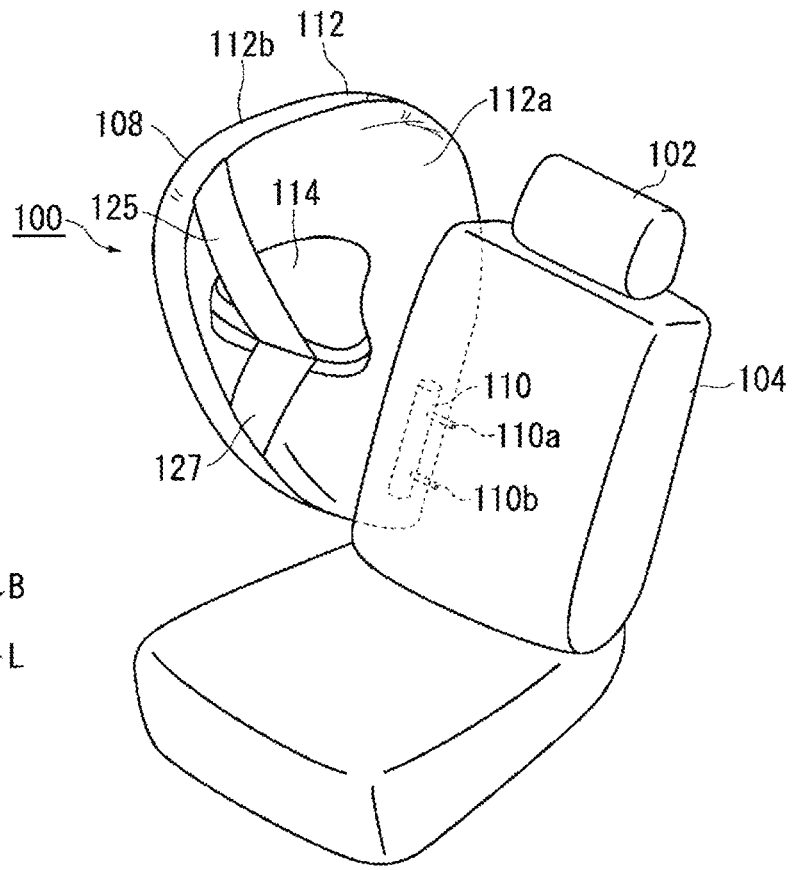

FIG. 1 is a diagram depicting the vehicular side airbag device (hereinafter, side airbag device 100) according to an embodiment of the present invention. FIG. 1(a) is a diagram depicting a state of the side airbag device 100 before activation. In FIG. 1(a) and FIG. 1(b), the side airbag device 100 and a seat 102 on the left side in the front row to which the side airbag device 100 is applied are depicted from the left side of the vehicle in the width direction, in other words from outside (outside vehicle) in the vehicle width direction.

In the present embodiment, when an occupant 136 (see FIG. 5(a)) is sitting in the seat 102 with a regular posture, the direction the occupant 136 is facing is defined as forward, the opposite direction is backward, the right hand side of the occupant 136 is right direction, and the left hand side of the occupant 136 is left direction. Furthermore, when the occupant 136 is seated in a regular posture, the direction towards the head of the occupant 136 is referred to as up, and the direction towards the legs of the occupant 136 is referred to as down. Also, in the drawings used in the description below, as necessary, the front, back, left, right, up, and down directions with reference to the occupant 136 in a regular position described above are illustrated by arrows F (Forward), B (Back), L (Left), R (Right), U (up), and D (down).

As depicted in FIG. 1(a), an airbag module 106 provided in the side airbag device 100 of the present embodiment is equipped in a seatback 104 of the seat 102 on the inside (interior side) in the vehicle width direction. The airbag module 106 includes an airbag cushion 108 for restraining the occupant and an inflator 110 for supplying gas to the airbag cushion 108.

In the present embodiment, as viewed from the occupant 136 (FIG. 5(a)) sitting in the seat 102 on the left side in the front row, the left side (outside vehicle) in the vehicle width direction is the side close to the collision, the so-called near side. On the other hand, the right side (vehicle interior) in the vehicle width direction as viewed from the occupant of seat 102 is far from the collision, the so-called far side. The airbag module 106 is installed in the far side of the seatback 104.

The airbag cushion 108 is a bag shaped member that can be expanded by gas and that expands and deploys in an emergency such as when the vehicle is in a collision, thus restraining the occupant 136 seated in the seat 102 (see FIG. 5(a) and the like). The airbag cushion 108 is in a rolled or folded stowed state prior to activation and is stowed in a side part of the seatback 104 on the vehicle interior side. In a stowed state, a short cover or the like covers the airbag cushion 108 so the airbag cushion is not visible from the outside.

The inflator 110 is a gas generating device and in this embodiment, a cylindrical type (cylinder shape) is used. The inflator 110 is encased to the bottom rear of a main chamber 112, described below, of the airbag cushion 108, with the longitudinal direction thereof aligned with the vertical direction of the seatback 104. The inflator 110 is electrically connected to the vehicle side, activates upon receipt of a signal resulting from detection of a collision from the vehicle, and supplies gas to the airbag cushion 108.

Examples of currently prevailing inflators include: types which are filled with a gas generating agent and burn the agent to generate gas; types which are filled with compressed gas and supply gas without generating heat; hybrid types which utilize both combustion gas and compressed gas; and the like. Any of these types can be used for the inflator 110.

The inflator 110 is provided with two stud bolts 110a and 110b, spaced apart in a longitudinal direction thereof. The stud bolts 110a and 110b are exposed externally through the base material of the airbag cushion 108 and are fastened and secured to a side frame 134 (see FIG. 4(a)) of the seatback 104. The stud bolts 110a and 110b are fastened to the seatback 104 through the airbag cushion 108 and the airbag cushion 108 is also mounted to the seatback 104.

FIG. 1(b) is a diagram depicting a state after expansion and deployment of the airbag cushion 108 of FIG. 1(a). When the side airbag device 100 detects a far side collision via various sensors and a prescribed Electronic Control Unit (ECU), the side airbag device activates the airbag module 106 provided on the far side.

The inflator 110 ejects gas based on an activation signal sent from the ECU described above or the like. The airbag cushion 108 pushes the skin of the seatback 104 out of the way and expands and deploys into the cabin space by using gas from the inflator 110.

The airbag cushion 108 of the present embodiment is composed of a broad shaped main chamber 112, and a sub chamber 114 that protrudes from the main chamber 112 toward the occupant side, as well as an upper tether 125 and lower tether 127 for retaining the orientation of the sub chamber 114.

The main chamber 112 constitutes a main portion of the airbag cushion 108 and expands and deploys with an overall flat shape. The outer surface of the main chamber 112 includes a main panel 112a positioned on the left side in the vehicle width direction, or the occupant side and a main panel 112b on the right side in the vehicle width direction, or the side opposite the occupant. The main panels 112a and 112b are made from a base material and are overall formed in a bag shape by sewing or adhering. Note that main chamber 112 can also be formed using a OPW (One-Piece Woven) textile or the like.

The sub chamber 114 expands and deploys protruding from above and to the front of the occupant side of the main chamber 112 and protrudes to the occupant side. The sub chamber 114 of the present embodiment functions so as to restrain a head 140 of the occupant 136 (see FIG. 5(a)).

The upper tether 125 and lower tether 127 are band-like members that support the orientation of the sub chamber 114. The upper tether 125 is passed over the front side of the sub chamber 114 and the upper front side of the main chamber 112. The lower tether 127 is passed over the front side of the sub chamber 114 and the lower front side of the main chamber 112. The upper tether 125 and lower tether 127 can be made of the same material as the main panel 112a, and the like.

Figure 2:
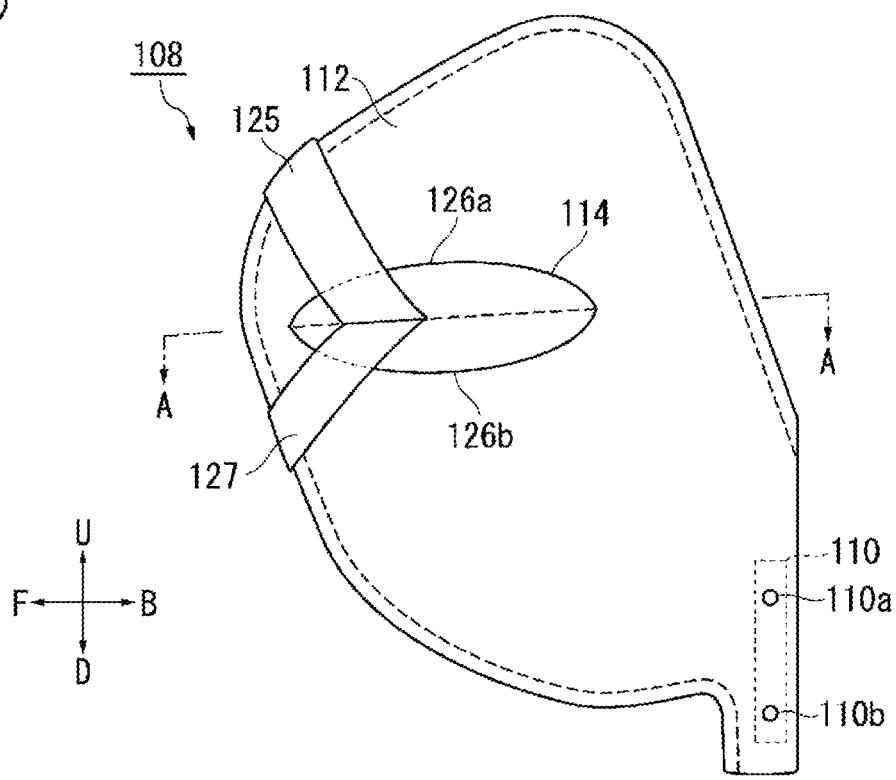
FIG. 2 is a diagram depicting the airbag cushion of FIG. 1(b) as viewed from various directions.
Figure 2:
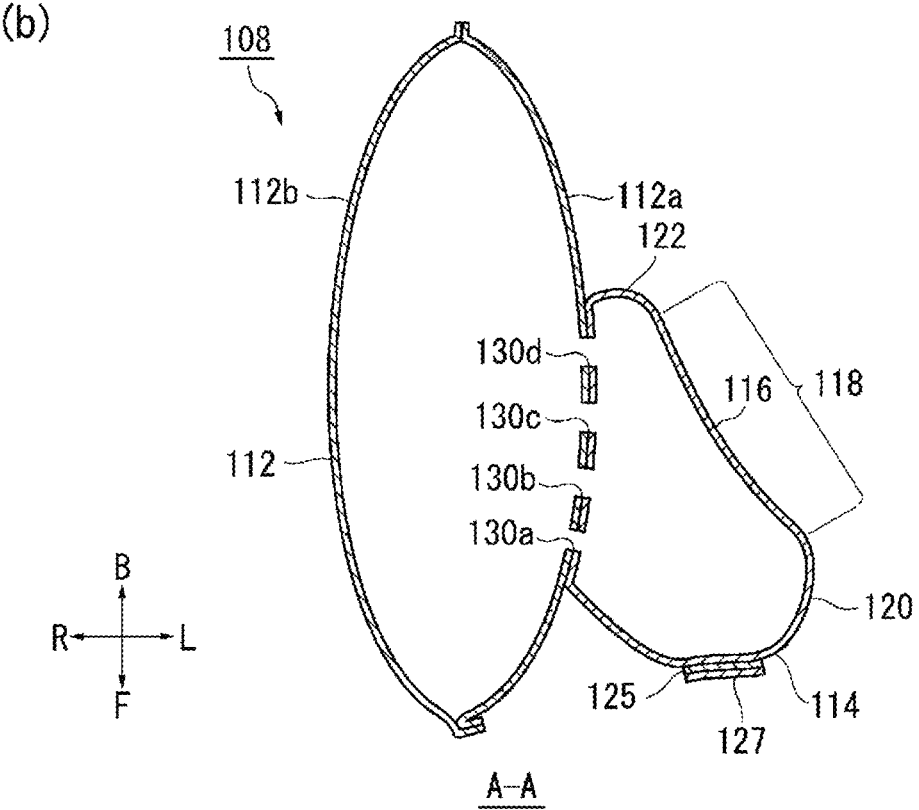

FIG. 2 is a diagram depicting the airbag cushion 108 of FIG. 1(b) as viewed from various directions. FIG. 2(a) is a diagram depicting the airbag cushion 108 of FIG. 1(b) from the interior side in the vehicle width direction. The main chamber 112 has the inflator 110 encased in the bottom rear part thereof and directly receives gas from the inflator 110 for expansion and deployment.

FIG. 2(b) is a cross-sectional view of the airbag cushion 108 of FIG. 1(b) along line A-A. The sub chamber 114 is connected to the main panel 112a on the occupant side of the main chamber 112 and expands and deploys from the main chamber 112, protruding toward the occupant side.

An edge 116 of the sub chamber 114 on the occupant side is concave curved toward the main chamber 112 side forming a curved part 118. Here, a front side end part 120 of the sub chamber 114 has more of a protruding shape to the occupant side (right side in FIG. 2(b)) as compared to a rear side end part 122. Thus, the curved part 118 is curved so as to gradually curve from back to front toward the occupant side.

A plurality of gas receiving openings 130a to 130d are provided in the sub chamber 114 in the region that is connected with the main chamber 112. The sub chamber 114 uses the gas receiving openings 130a to 130d to receive gas from the main chamber 112 for expansion and deployment. In other words, gas from the inflator 110 is first supplied to the main chamber 112 and then the gas is supplied through the main chamber 112 to the sub chamber 114. This configuration enables the main chamber 112 and the sub chamber 114 to suitably expand and deploy using gas from the inflator 110.

Figure 3:
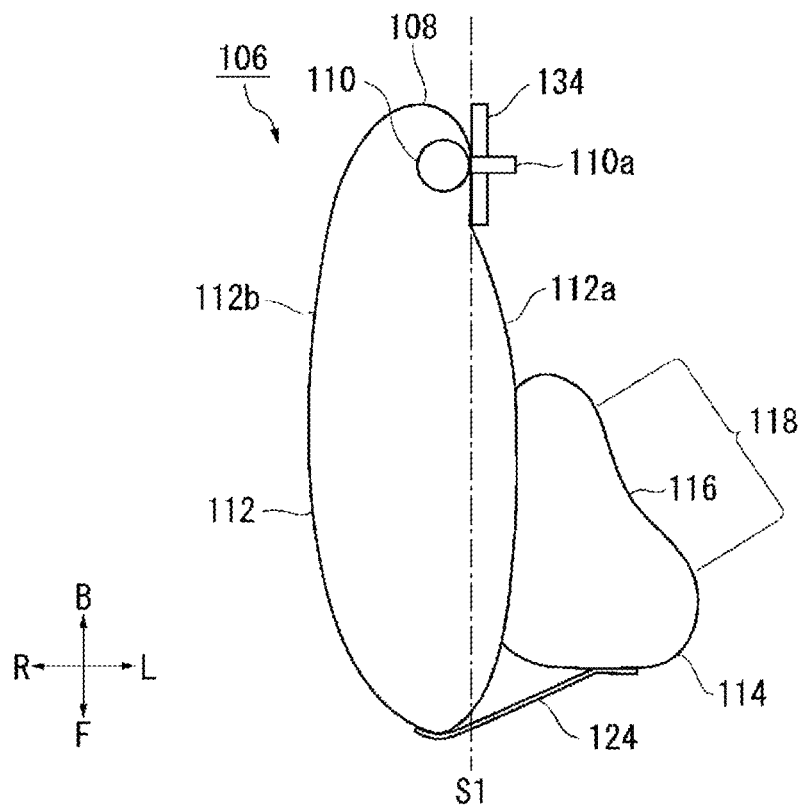
FIG. 3 is a diagram depicting the airbag module in FIG. 1(b) from various directions.
Figure 3:
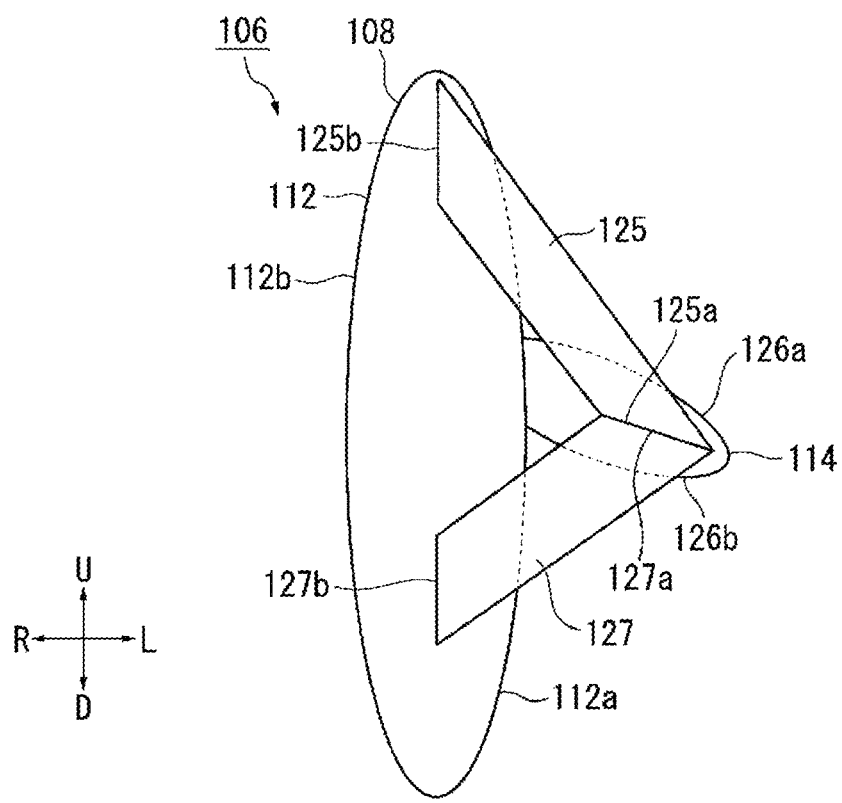

FIG. 3 is a diagram depicting the airbag module 106 in FIG. 1(b) from various directions. FIG. 3(a) is a schematic view of the airbag module 106 of FIG. 1(b) as viewed from above.

The airbag module 106 is mounted to the side frame 134 of the seatback 104 (see FIG. 1(b)) on the interior side in the vehicle width direction. Furthermore, the main chamber 112 expands and deploys from the side frame 134 to the side of the occupant 136 (see FIG. 5(a)) seated in the seat 102.

FIG. 3(b) is a schematic view of the airbag module 106 of FIG. 1(b) as viewed from the front. The sub chamber 114 expands and deploys protruding from the main chamber 112 and to the occupant side.

A horizontally extending lower side 125a of the upper tether 125 is connected to the front edge of the sub chamber 114. Furthermore, a vertically extending upper side 125b is connected to an edge of a portion of the main chamber 112 that is above the sub chamber 114 and stretches from an upper side to a front side of the main chamber 112.

A horizontally extending upper side 127a of the lower tether 127 is connected to the front edge of the sub chamber 114. Furthermore, a vertically extending lower side 127b is connected to an edge of a portion of the main chamber 112 that is below the sub chamber 114 and stretches from a front side to a lower side of the main chamber 112.

Figure 4:
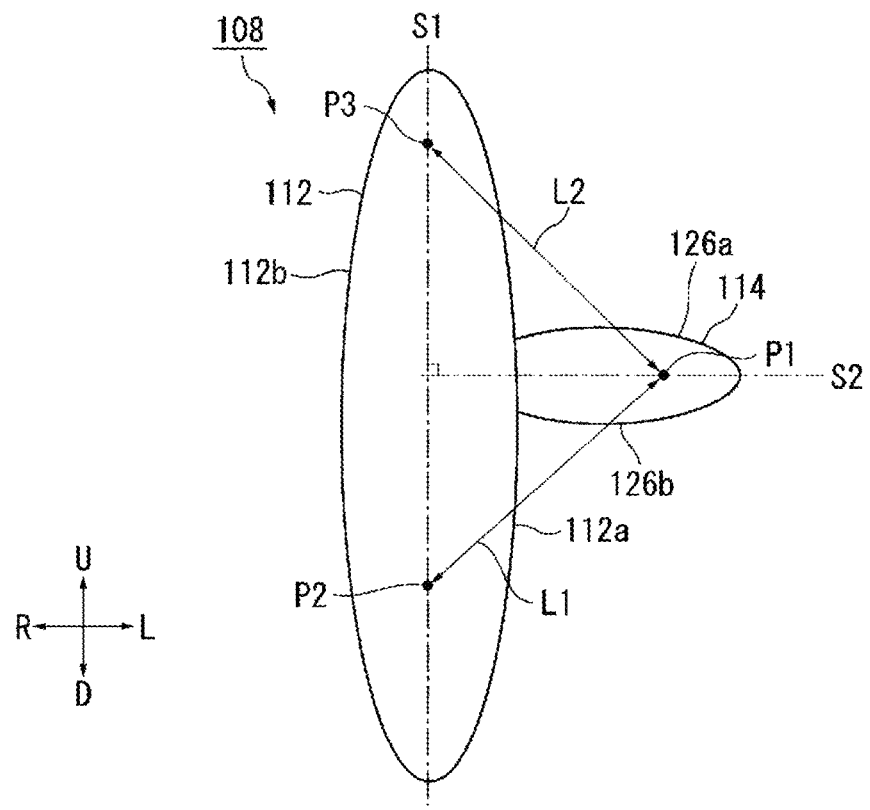
FIG. 4 is a schematic diagram of the airbag cushion of FIG. 3(b).
Figure 4:
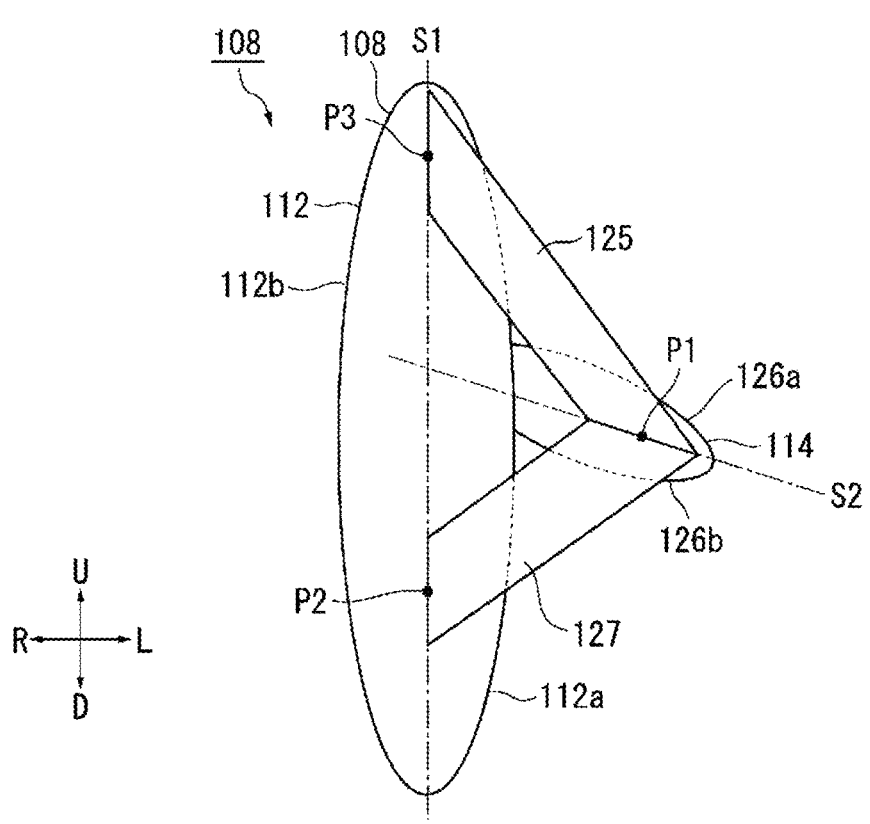

FIG. 4 is a schematic diagram of the airbag cushion 108 of FIG. 3(b). FIG. 4a depicts the airbag cushion 108 with the upper tether 125 and the lower tether 127 of FIG. 3(b) omitted.

A first virtual plane S1 depicted in FIG. 4(a) is a plane that extends vertically and longitudinally along the main chamber 112. With the upper tether 125 and the lower tether 127 omitted, the main chamber 112 expands and deploys along this first virtual plane S1, in other words vertically and longitudinally parallel to the first virtual plane S1.

With the upper tether 125 and the lower tether 127 omitted, the sub chamber 114 expands and deploys along a second virtual plane S2. The second virtual plane S2 is a plane that intersects with the first virtual plane S1 and with the upper tether 125 and the lower tether 127 omitted, spreads in the horizontal direction.

FIG. 4(b) is a diagram depicting a state of the airbag cushion 108 of FIG. 4(a) with the upper tether 125 and the lower tether 127 provided. One of the upper tether 125 and the lower tether 127 can be set to a longer length than the other. For example, setting the length of the upper tether 125 longer than the lower tether 127 and weakening tension of the upper tether 125 enables the lower tether 127 to pull the sub chamber 114 downward, and thereby tilt the sub chamber 114 downward.

The length of the lower tether 127 is set shorter than the distance L1 in FIG. 4(a). In detail, the distance L1 depicted in FIG. 4(a) is the distance from connecting part P1 of the lower tether 127 on the sub chamber 114 to connecting part P2 of the lower tether 127 on the main chamber 112 with the upper tether 125 and the lower tether 127 omitted and the main chamber 112 and the sub chamber 114 expanded and deployed. The lower tether 127 of FIG. 4(b) is shorter than distance L1 enabling the sub chamber 114 to be pulled downward.

On the other hand, the length of the upper tether 125 is set longer than the distance L2 in FIG. 4(a). In detail, the distance L2 depicted in FIG. 4(a) is the distance from connecting part P1 of the upper tether 125 on the sub chamber 114 to connecting part P3 of the upper tether 125 on the main chamber 112 with the upper tether 125 and the lower tether 127 omitted and the main chamber 112 and the sub chamber 114 expanded and deployed. The upper tether 125 of FIG. 4(b) is longer than distance L2 to avoid excessive pulling on the sub chamber 114.

With the configuration described above, the lower tether 127 can be efficiently tensed during expansion and deployment of the airbag cushion 108. Thus, for example, the shape of the airbag cushion 108 can be arbitrarily controlled, such as tilting the sub chamber 114 downward.

Figure 5:
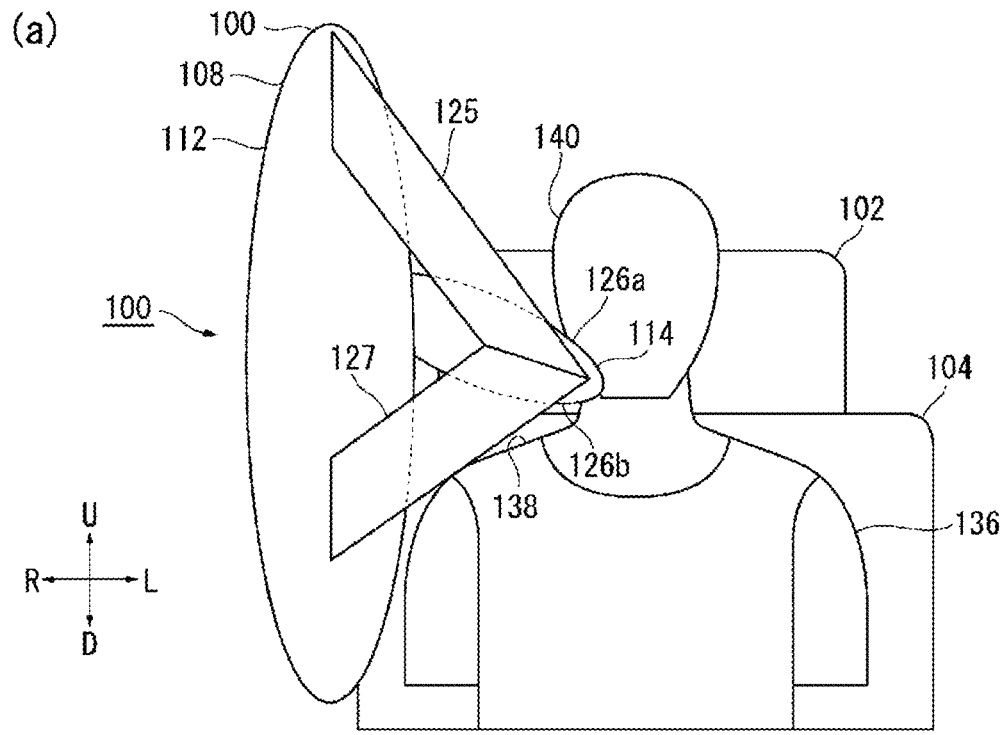
FIG. 5 is a diagram depicting the side airbag device of FIG. 1(b) and an occupant.
Figure 5:
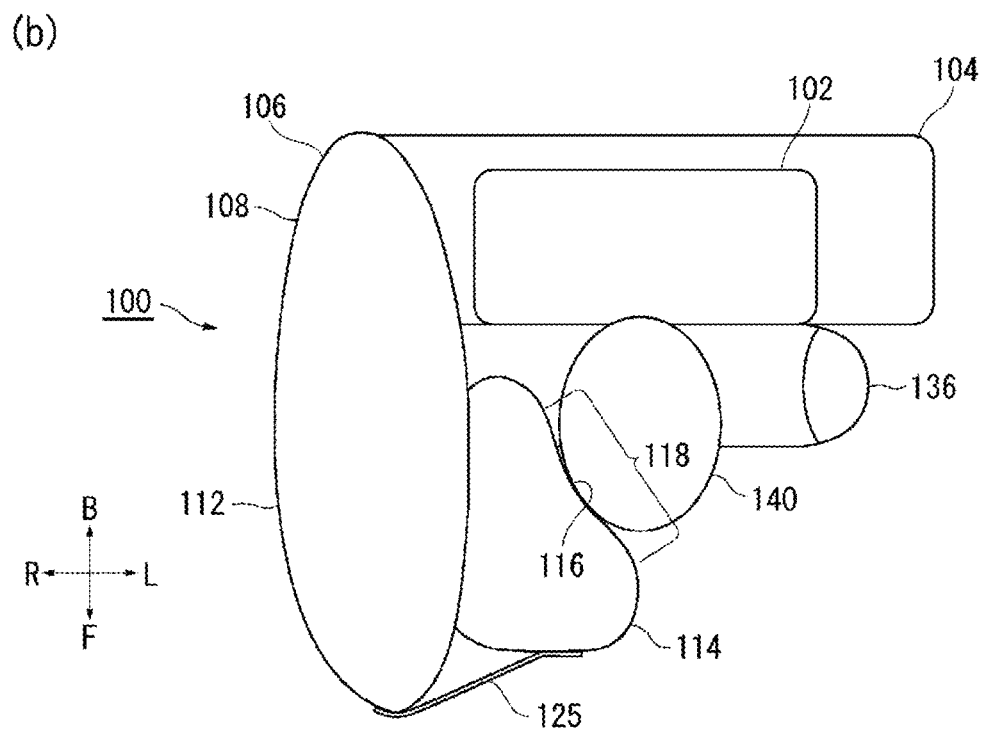

FIG. 5 is a diagram depicting the side airbag device 100 of FIG. 1(b) and an occupant 136. FIG. 5(a) depicts the side airbag device 100 from the front of the seat 102. The occupant 136 in FIG. 5(a) is depicted as a test dummy doll AM50 which imitates a physique (height of 175 cm and weight of 78 kg) suitable for 50% of average US adult males.

As described above, the main chamber 112 expands and deploys to the side of the occupant 136. Furthermore, the sub chamber 114 is provided on the occupant side of the main chamber 112 and is positioned so that upon expansion and deployment, the lower region 126 thereof is above the height of a shoulder 138 of the occupant 136. With this configuration, the sub chamber 114 is able to restrain the head 140 of the occupant 136.

The upper tether 125 and the lower tether 127 pull the sub chamber 114 toward the main chamber 112 enabling stabilization of the orientation of the sub chamber 114. In particular, the lower tether 127 pulls the front side of the sub chamber 114 downward at an angle toward the main chamber 112 and enables retaining the downward tilt orientation of the sub chamber 114. In addition, the lower tether 127 enables restraining the shoulder 138 and chest of the occupant 136 from the front.

With the upper tether 125 and the lower tether 127 described above, occupant restraint performance by the sub chamber 114 can be improved such as controlling the contact position and contact timing of the sub chamber 114 with the head 140 and tilting the sub chamber 114 downward to restrain the shoulder 138.

FIG. 5(b) depicts the side airbag device 100 from above the seat 102. Utilizing the curved part 118, the sub chamber 114 is able to contact the head 140 of the occupant 136 from the side to the front. Restraint of the head 140 of the occupant 136 by the curved part 118 of the sub chamber 114 prevents forward movement on the far side and suppresses rotation around the neck.

In general, rotation behavior of the head 140 is known to raise injury value of the occupant 136. In this respect, with the present Embodiment, the sub chamber 114 can be used to suppress rotational behavior of the head. In particular, in addition to the sub chamber 114 being broadly supported by the main chamber 112, pulling by the upper tether 125 and lower tether 127 enables retaining orientation thereof. Thus, with the present embodiment, during occupant restraint, the sub chamber 114 can efficiently absorb energy from the head 140 of the occupant 136, achieve a simple configuration, and suitably lower injury value of the occupant 136.

As depicted in FIG. 4(a), with the present embodiment, the airbag module 106 is assembled to the outside of the side frame 134 but this airbag module 106 can also be assembled to the inside of the side frame 134. With this configuration as well, the occupant 136 (see FIG. 5(a)) can be preferably restrained using the airbag cushion 108.

In addition, in the present embodiment, the description is provided based on the airbag cushion 108 being provided on the far side of the seatback 104. Providing of the airbag cushion 108 on the far side of the seatback 104 enables suitable restraint of the occupant 136 moving to the far side during a collision. However, of course the airbag cushion 108 can be provided on the near side of the seatback 104 and in this case as well the main chamber 112 and the sub chamber 114 can be used to suitably restrain the occupant 136 (see FIG. 5(a)).

Modified Example

Figure 6:
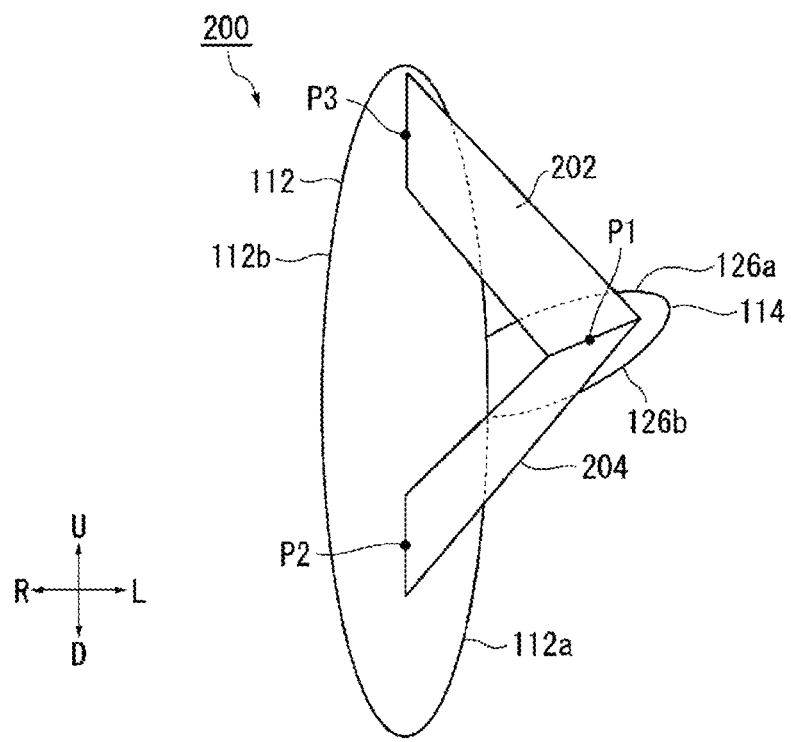
FIG. 6 is a diagram depicting a modified example of the airbag cushion in FIG. 4.
Figure 6:
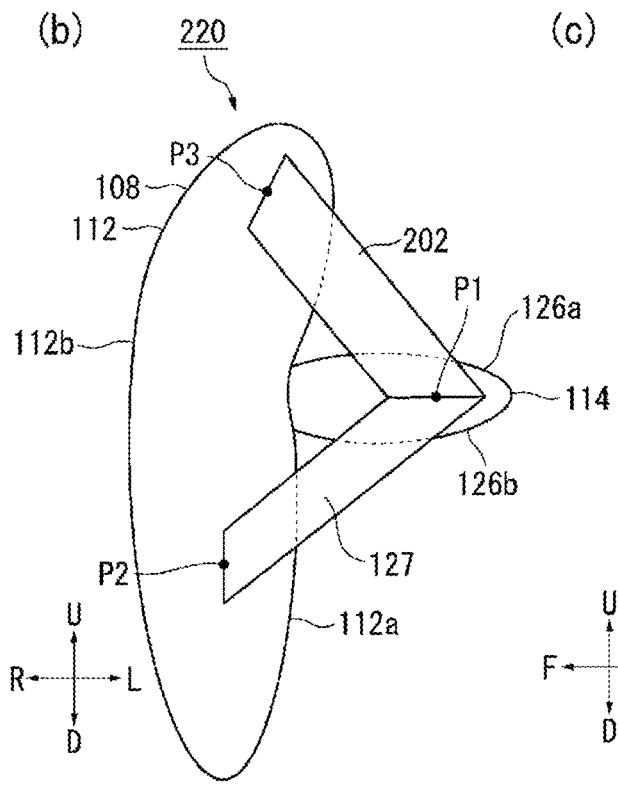
Figure 6:
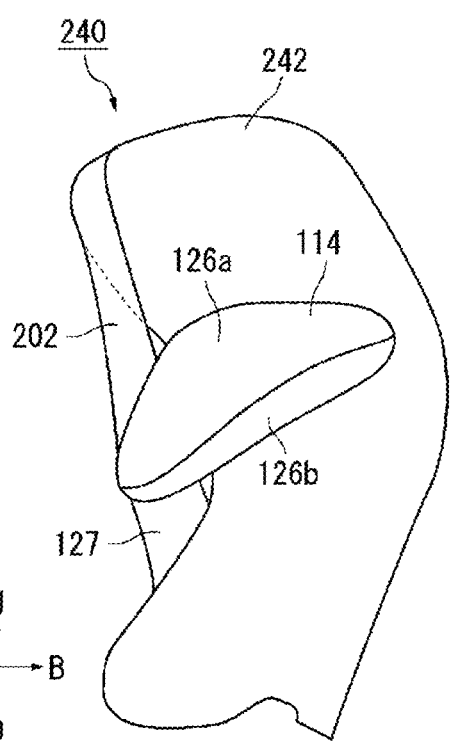

FIG. 6 is a diagram depicting a modified example of the airbag cushion 108 in FIG. 4. In FIG. 6, the same signs are attached to the same structural elements as those described above, and a description of the aforementioned structural elements is omitted. In the following description, components having the same name as a component already described are assumed to have the same function unless otherwise specified, even if marked with a different sign.

FIG. 6(a) is a diagram depicting Modified Example 1 of the airbag cushion 108 in FIG. 4 (airbag cushion 200). With the present Embodiment, the length of a lower tether 204 is set longer than an upper tether 202. Thus, by weakening tension on the lower tether 204 for the airbag cushion 200, the sub chamber 114 is pulled upward by the upper tether 202 causing the sub chamber 114 to tilt upward.

The length of the upper tether 202 is set shorter than the distance L2 of FIG. 4(a). On the other hand, the length of the lower tether 204 is set longer than distance L1 of FIG. 4(a).

With the configuration described above, the upper tether 202 can be efficiently tensed during expansion and deployment of the airbag cushion 200. Thus, for example, the shape of the airbag cushion 108 can be arbitrarily controlled, such as tilting the sub chamber 114 upward.

FIG. 6(b) is a diagram depicting Modified Example 2 of the airbag cushion 108 in FIG. 4 (airbag cushion 220). This airbag cushion 220 utilizes the upper tether 202 and lower tether 127 described above. This configuration enables tensing of the upper tether 202, lower tether 127 during expansion and deployment of the airbag cushion 220 and causing the main chamber 112 to curve toward the sub chamber 114.

FIG. 6(c) is a diagram depicting Modified Example 3 of the airbag cushion 108 in FIG. 4 (airbag cushion 240). With the airbag cushion 240, tensing the upper tether 202 together with the lower tether 204 enables causing curved deformation of a main chamber 242 to the front. With the airbag cushion 240, the region of the main chamber 242 centered on the sub chamber 114 does not readily spread and absorption performance of the load from the occupant 136 (see FIG. 5(a)) can be improved.

Preferred examples of the present invention were described above while referring to the attached drawings. However, the embodiments described above are preferred examples of the present invention, and other embodiments can be implemented or performed by various methods. In particular, unless described otherwise in the specification of the present application, the invention is not limited to the shape, size, configurational disposition, and the like of parts illustrated in detail in the attached drawings. Furthermore, expressions and terms used in the specification of the present application are used for providing a description, and the invention is not limited thereto, unless specifically described otherwise.

Therefore, it is obvious that a person of ordinary skill in the art can conceive various changed examples or modified examples within the scope described in the scope of the claims, which is understood to naturally belong to the technical scope of the present invention.

INDUSTRIAL APPLICABILITY

The present invention can be used in an occupant restraining device for restraining an occupant seated in a seat of a vehicle.

EXPLANATION OF CODES

100. Side airbag device, 102. Seat, 104. Seatback, 106. Airbag module, 108. Airbag cushion, 110. Inflator, 110a, 110b. Stud bolts, 112. Main chamber, 112a, 112b. Main panel, 114. Sub chamber, 116. Edge, 118. Curved part, 120. End part, 122. End part, 125. Upper tether, 125a. Lower side, 125b. Upper side, 126a, 126b. Lower region, 127. Lower tether, 127a. Upper side, 127b. Lower side, 130a, 130b, 130c, 130d. Gas receiving opening, 134. Side frame, 136. Occupant, 138. Shoulder, 140. Head, L1, L2. Distance, P1, P2. Connecting part, S1, S2. Plane, 200. Airbag cushion, 202. Upper tether, 204. Lower tether, 220. Airbag cushion, 240. Airbag cushion, 242. Main chamber.

The invention claimed is:
1. A vehicular side airbag device mounted on a side frame of a seatback of a seat for a vehicle, comprising:
   an airbag cushion having a bag shape and stowable in a prescribed rolled or folded configuration; and
   an inflator for supplying gas to the airbag cushion;
   wherein the airbag cushion includes:

a main chamber configured to expand and deploy from the side frame to a side of an occupant seated on the seat, a sub chamber configured to expand and deploy to protrude from the main chamber to a side and a front of an occupant seated on the seat, the sub chamber including a rear side that faces toward the seatback and an opposite front side that faces away from the seatback when the sub chamber is deployed, an upper tether for stretching from a portion of the main chamber above the sub chamber to the sub chamber, and a lower tether for stretching from a portion of the main chamber below the sub chamber to the sub chamber, wherein the upper tether and the lower tether each pass over the front side of the sub chamber upon expansion and deployment of the airbag cushion.

2. The vehicular side airbag device according to claim 1, wherein one of the upper tether and the lower tether is longer than the other of the upper tether and the lower tether.

3. The vehicular side airbag device according to claim 1, wherein the upper tether is longer than the lower tether.

4. The vehicular side airbag device according to claim 2, wherein the upper tether is longer than the lower tether.

5. The vehicular side airbag device according to claim 1, wherein the lower tether is longer than the upper tether.

6. The vehicular side airbag device according to claim 2, wherein the lower tether is longer than the upper tether.

7. The vehicular side airbag device according to claim 1, wherein the main chamber includes a rear side that faces toward the seatback and an opposite front side that faces away from the seatback, and wherein the upper tether and the lower tether each pass over the front side of the main chamber upon expansion and deployment of the airbag cushion.

8. The vehicular side airbag device according to claim 1, wherein the upper tether and the lower tether are both connected to the front side of the sub chamber.

9. The vehicular side airbag device according to claim 1, wherein the sub chamber includes an upper region, an opposite lower region, and an edge extending in a substantially horizontal direction between the upper region and the lower region, and wherein the upper tether and the lower tether are both connected to the sub chamber along the edge of the sub chamber.

10. The vehicular side airbag device according to claim 9, wherein the upper tether and the lower tether overlap each other along the edge of the sub chamber.

11. The vehicular side airbag device according to claim 1, wherein the main chamber is configured to expand and deploy along a first virtual plane that extends in a substantially vertical direction and the sub chamber is configured to expand and deploy along a second virtual plane that intersects the first virtual plane and extends in a substantially horizontal direction and in a downward direction from the first virtual plane toward the vehicle seat.

12. The vehicular side airbag device according to claim 3, wherein the sub chamber includes a proximal end connected to the main chamber and an opposite distal end protruding from the main chamber toward an occupant seated on the seat, and wherein the lower tether pulls the distal end of the sub chamber downward at an angle toward the portion of the main chamber below the sub chamber when the sub chamber expands and deploys upon expansion and deployment of the airbag cushion.

13. The vehicular side airbag device according to claim 5, wherein the sub chamber includes a proximal end connected to the main chamber and an opposite distal end protruding from the main chamber toward an occupant seated on the seat, and wherein the upper tether pulls a distal end of the sub chamber upward at an angle toward the portion of the main chamber above the sub chamber when the sub chamber expands and deploys upon expansion and deployment of the airbag cushion.

14. The vehicular side airbag device according to claim 1, wherein the main chamber includes a rear side that faces toward the seatback, an opposite front side that faces away from the seatback, and an outer surface defined by a first main panel that faces toward the seat and an opposite second main panel that faces away from the seat when the main chamber is deployed, and wherein the sub chamber is connected to a central region of the first main panel of the main chamber at a location substantially midway between the front side and the rear side of the main chamber upon expansion and deployment of the airbag cushion.

15. The vehicular side airbag device according to claim 1, wherein the sub chamber includes a plurality of gas receiving openings through which the sub chamber receives gas from the main chamber.

16. The vehicular side airbag device according to claim 1, wherein the upper tether includes a lower side connected to the front side of the sub chamber and an upper side connected to the portion of the main chamber above the sub chamber, and wherein the lower tether includes an upper side connected to the front side of the sub chamber and a lower side connected to the portion of the main chamber below the sub chamber.

17. The vehicular side airbag device according to claim 16, wherein the lower side of the upper tether extends in a substantially horizontal direction, the upper side of the upper tether extends in a substantially vertical direction, the upper side of the lower tether extends in a substantially horizontal direction, and the lower side of the lower tether extends in a substantially vertical direction.

18. The vehicular side airbag device according to claim 16, wherein the upper tether and the lower tether are constructed and arranged such that tension on the upper tether and the lower tether during expansion and deployment of the airbag cushion causes an upper end and an opposite lower end of the main chamber to curve toward the sub chamber.

19. The vehicular side airbag device according to claim 16, wherein the upper tether and the lower tether are constructed and arranged such that tension on the upper tether and the lower tether during expansion and deployment of the airbag cushion causes an upper end and an opposite lower end of the main chamber to curve away from the seatback.

* * * * *